Feb. 23, 1971 — E. WILDHABER — 3,564,868
UNIVERSAL JOINT
Filed Oct. 28, 1969 — 3 Sheets-Sheet 1

INVENTOR.
Ernest Wildhaber

INVENTOR:
Ernest Wildhaber

United States Patent Office 3,564,868
Patented Feb. 23, 1971

3,564,868
UNIVERSAL JOINT
Ernest Wildhaber, Brighton, N.Y.
(124 Summit Drive, Rochester, N.Y. 14620)
Continuation-in-part of application Ser. No. 736,185,
June 11, 1968. This application Oct. 28, 1969, Ser.
No. 871,935
Int. Cl. F16d 3/30
U.S. Cl. 64—21                                14 Claims

ABSTRACT OF THE DISCLOSURE

This constant-velocity universal joint contains an outer member and a generally cup-shaped inner member both provided with ways at a constant distance from their axes. The ways are engaged by balls maintained in position by sliding blocks movable along the ways of preferably the outer member. The displacement of said blocks is effected by a part pivotable with respect to both members. This part acts through ball-parts that are either bodily movable with the blocks or have a constant distance from the axis of the pivotable part.

This application is a continuation-in-part of my co-pending patent application filed June 11, 1968, Ser. No. 736,185.

The present invention relates to universal joints of the constant velocity type containing an outer member having internal ways and an inner member of general cup-shape having ways on its outside, with balls engaging the ways of both members. To transmit uniform motion, the balls have to be kept in the bisector plane of the axes of said members. The invention provides novel ways of maintaining the balls in this plane. In the illustrated preferred embodiments the balls are guided and positioned by blocks individually movable along said internal ways. Prior art shows individual blocks slidable along the ways of the inner member, where the block position is controlled by direct engagement of the block with portions of the outer member. With such known disposition the shaft angularity is limited and the axial displacement range between the two joint members is also limited.

One object of the present invention is to raise these limits, both as to angularity and as to relative axial displacement.

A further aim is to fulfill the kinematic requirements to an improved and very close degree.

A further object is to arrive at a practical design.

Other objects will appear in the course of the specification and in the recital of the appended claims.

FIGS. 1 to 4 of the drawings relate to one embodiment of the invention.

FIG. 5 is an axial section of this universal joint.

FIG. 6 is a diagram explanatory of the action of its pivoted control member.

Figure 7:
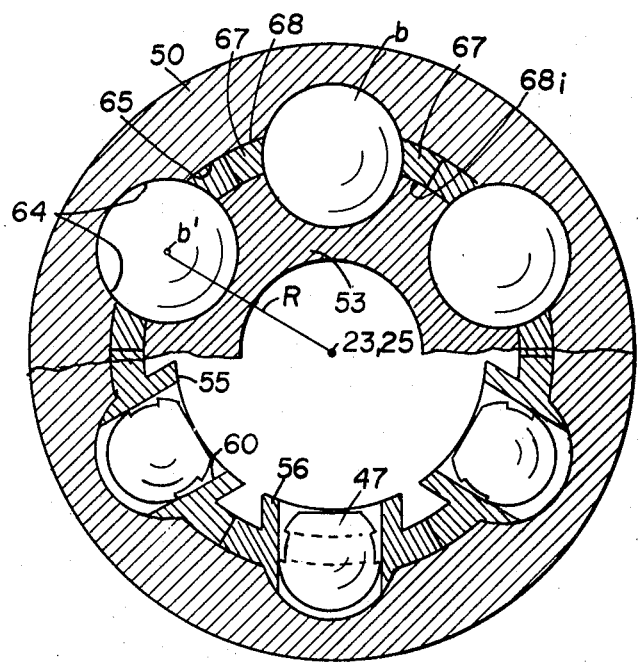

FIG. 7 is a cross-section of the universal joint with the two joint members in alignment, taken at right angles to axis 23. The upper half is a section laid through point 0, the intersection of the joint axes. The lower half is a section laid through pivot point 49 (FIG. 5).

Figure 5:
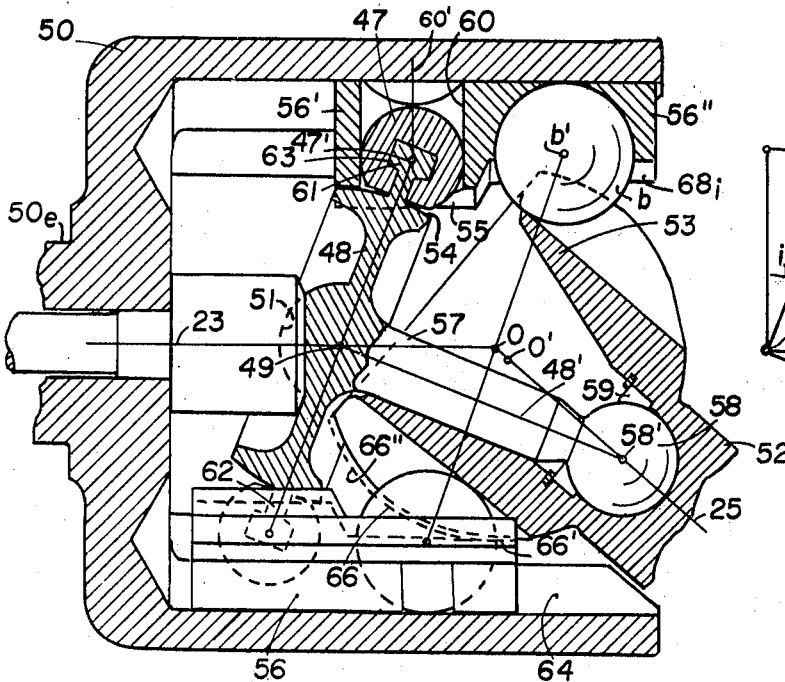
FIGS. 5 to 9 illustrate another embodiment of the invention.
Figure 8:
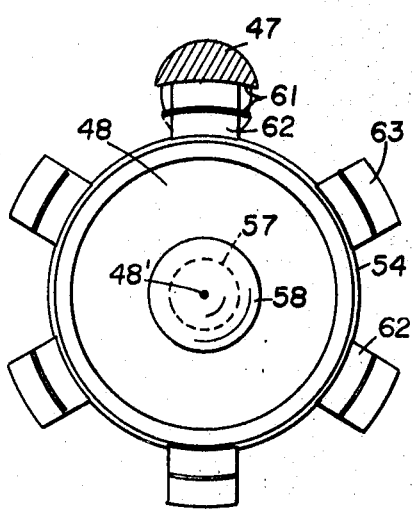

FIG. 8 is an end view of the pivoted control member, looking from right to left in FIG. 5. It also shows one of the ball-parts engaged thereby.

Figure 9:
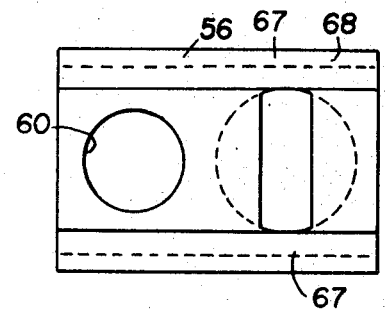

FIG. 9 is a radial view of a ball-holding block, looking from the outside.

Figure 10:
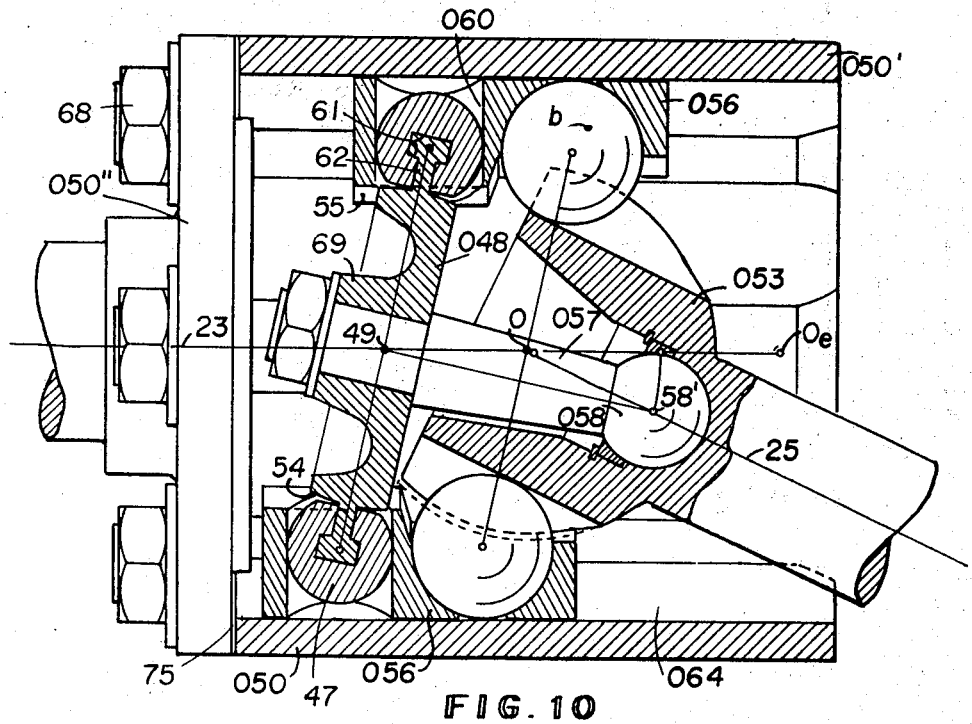

FIG. 10 is an axial section of a modified embodiment, where the joint members have axial freedom.

Figure 11:
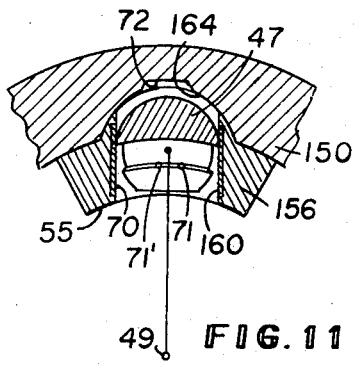

FIG. 11 is a fragmentary cross-section taken through the main pivot point of the control part of a slightly modified design. It shows a ball-part, a ball-holding block and the adjacent portion of the outer member.

In the embodiment illustrated in FIGS. 1 to 4 the outer joint member 20 is here made in two parts 20', 20" rigidly connected by a toothed face coupling 21 of known design. Part 20' contains straight ways 22 spaced about and parallel to its axis 23. The inner member 24 also contains straight ways. They are spaced about and parallel to its own axis 25. The members 20, 24 are operatively connected by balls $b$ that roll and slide on the ways of both members. The balls are held in position by sliding blocks 26 whose axially opposite sides 26', 26" are connected through a single rib 27 (FIG. 2) that reaches into a recess 28 provided in way 22 at its outside. The blocks 26 are guided by the ways 22 and by said recess, so that they only perform a straight translation with respect to outer member 20.

The members 20, 24 are here pivotally connected: The spherical outside surface 30 of member 24 fits into the spherical inside surface 31 (FIG. 3) of the outer member 20. For assembly, the two members are moved together axially, with the teeth intermediate the ways of the inner member in line with the ways of the outer member. One of the members is then turned on its axis to align the ways of both members and the teeth.

Figure 1:
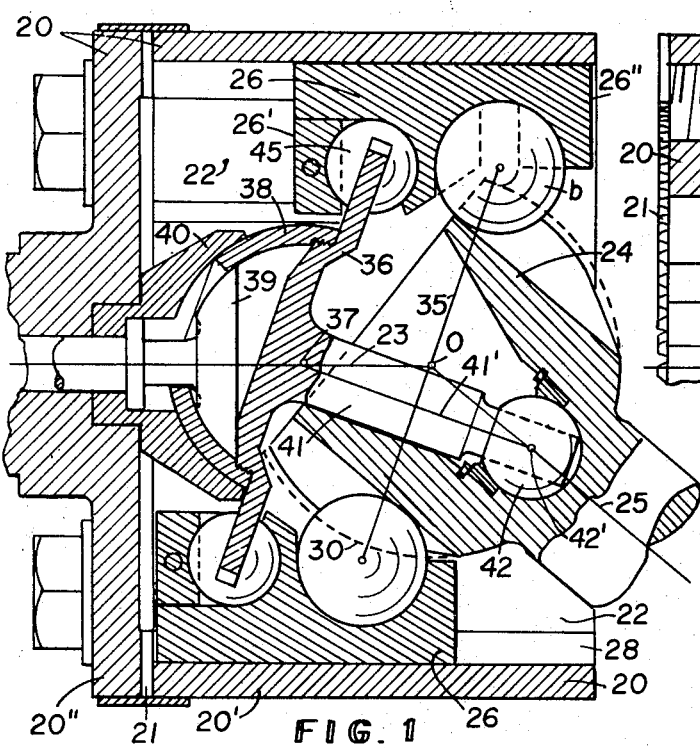
FIG. 1 is an axial section of a universal joint shown at its design angularity, the largest angularity it permits.
Figure 3:
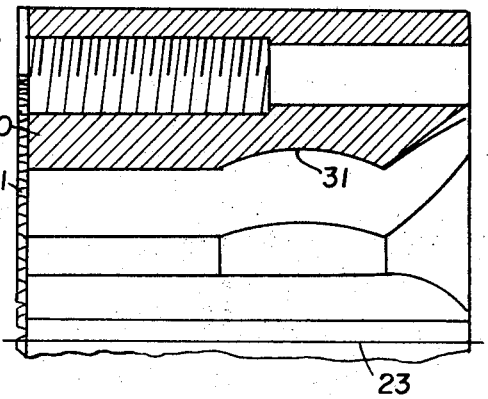
FIG. 3 is a fragmentary axial section taken through the outer member along lines 3—3 of FIG. 2.
Figure 2:
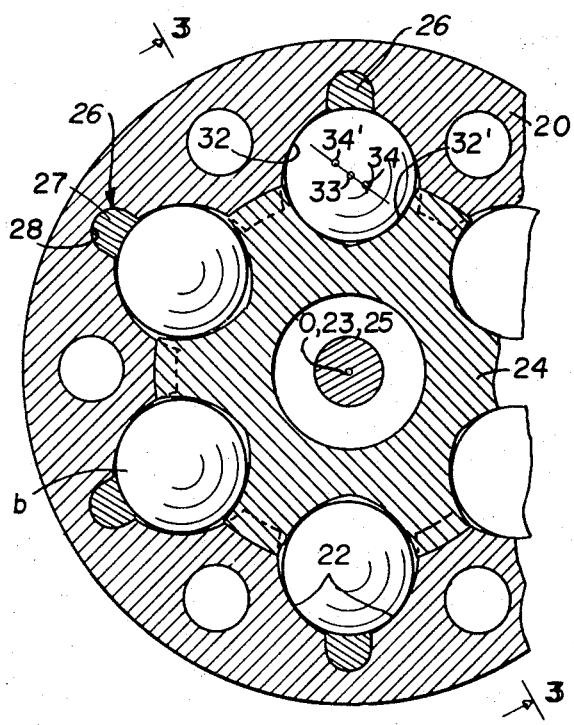
FIG. 2 is a cross-section taken through the intersection point 0 of its axes, with the axes shown in alignment.
Figure 4:
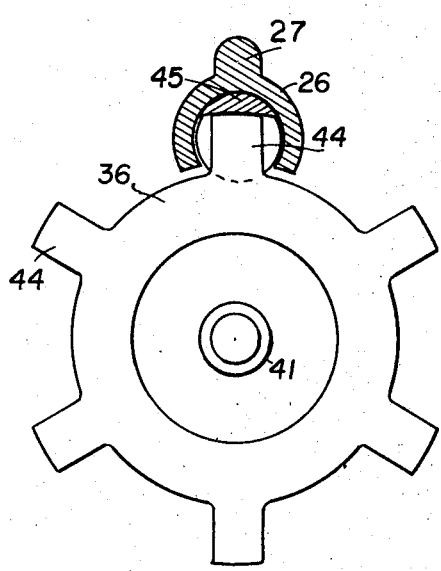
FIG. 4 is an axial view of the pivotable control part 36 of FIG. 1, looking from right to left, and a cross-section of one of the blocks engaged thereby.

While the concave profiles of the ways could completely match the ball profiles, the concave way-profiles are shown less curved than the ball profiles that are centered at 33 (FIG. 2). The way-profiles 32, 32' are arcs centered at 34 and 34' respectively, to decrease friction.

The control means for keeping the balls in the bisector plane 35 comprise a part 36 carried by and pivotally connected to the outer member 20 at a fixed point 37 of its axis 23. A hollow spherical segment 38 is rigidly connected with part 36 and engages a pair of spherical parts 39, 40 that straddle segment 38. They confine part 36 to pivotal motion about center 37. Parts 39, 40 are rigidly secured to member 20. Part 36 has a cylindrical projection 41 with axis 41'. Its end has a reduced diameter and reaches through a ball 42 pivoted in member 24 with its center 42' on axis 25, at a fixed distance from joint center 0. This distance equals distance 0–37 of center 37 therefrom. In this way axis 41' of projection 41 is always perpendicular to the bisector plane 35 wherein the centers of the balls $b$ are to lie.

Part 36 contains plane-sided projections 44 (FIG. 4), one for each block 26. Each reaches into a slot provided in a ball 45 pivotally mounted in a block 26, in line with each ball $b$, so that the centers of balls 45, $b$ are displaced from each other in the direction of axis 23. Ball $b$ thus has the same axial motion as ball 45, and stays in the bisector plane 35 at all times, as desired.

In universal joints designed for materially smaller angles a conventional ball joint may be used at center 37.

It should be noted that part 36 is pivotable with respect to both members 20, 24, and that it has a plurality of radial projections 44 spaced about is axis 41' and disposed wholly on one side of the intersection 0 of the axes 23, 25. There is one projection for each ball $b$. The projections 44 are surrounded and enclosed by the ball-holding means and have plane working surfaces perpendicular to axis 41', on opposite sides. Note also that the block positioning means include balls or ball-parts, one ball-part for each block.

In the above-described embodiment the pivotable part 36 is tilted exactly like the bisector plane, and each ball-part 45 pivots about a fixed point of a block 26.

OTHER EMBODIMENTS

A pivotable control part and ball-parts are also used in the embodiment to be described with FIGS. 5 to 9, which also has ways parallel to the axis of the respective joint member.

The ball-parts 47 are however maintained at a fixed distance from the axis 48' of the pivotable control part 48. Part 48 tilts about a fixed point 49 of axis 23 of the outer member 50. It is maintained in engagement by spring pressure with a spherical cup 51 rigidly secured to member 50. The spring pressure (not shown) is exerted on the shaft 52 of the inner member 53 at a distance. Part 48 contains a convex spherical surface portion 54 that bears against cylindrical surface portions 55 provided on the sliding blocks 56 that hold the driving balls *b*. Cylindrical portions 55 are coaxial with the axis 23 of the outer member 50.

A stem 57 of part 48 has a ball-end 58 pivotally attached to the inner member 53 of the universal joint. Its center 58' lies on the axis 25 of the inner member. Ring 59 of the ball joint is split into two parts for assembly.

The ball-parts 47 are slidable in bores 60 of blocks 56. The bores 60 are radial of axis 23. The ball-parts contain T-slots 61 that extend about the axis 48' of part 48. Part 48 contains a plurality of radial projections 62 spaced about axis 48', one for each ball-part. They have a T-shape matching the T-slots 61 of the ball-parts. The upper and lower portions of said T-shape lie in surfaces of revolution extending about axis 48'; and the working sides 63 are planes perpendicular to said axis. This shape permits some rotation of part 48 with respect to the ball-parts held in bores 60.

The distance 0–49 from the intersection 0 of the axes 23, 25 to pivot point 49 is equal to the distance of the bore axis 60' from the ball center *b'*, a distance built into the blocks 56.

Figure 6:
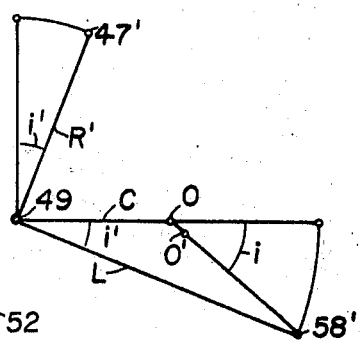

Diagram FIG. 6 shows how the inclination *i'* of part 48 depends on the angularity *i* between the joint axes 23, 25. Let L denote the fixed distance between the pivot centers 49, 58' and C the distance 0–49. The angles *i* and *i'* are then related as follows (1)
$$\tan i = \frac{L \sin i'}{L \cos i' - C} = \frac{\sin i'}{\cos i' - \frac{C}{L}}$$

This can be transformed into (2)
$$\sin (i - i') = \frac{C}{L} \sin i$$

The block displacement is equal to the displacement of the ball center *b'*, which should stay in the bisector plane. At any given angularity *i*, the block displacement in the plane of the axes 23, 25 should equal $R \tan(\frac{1}{2}i)$, wherein R denotes the distance of the ball center *b'* from the joint axes 23, 25.

Let R' denote the distance 49–47' between the pivot point 49 and the sphere center of the ball-part 47. The displacement obtained with ball-part 47 is $R' \sin i'$. It should be equal to $R \tan(\frac{1}{2}i)$.

At very small angles *i*, *i'* the arc measure can be substituted for the sine-function, so that in this region $$\tfrac{1}{2} R \cdot i = R' \cdot i'$$

In this region also $$(i - i') = \frac{C}{L} i$$

and $$i' = \left(1 - \frac{C}{L}\right) i$$

according to Eq. 2. Thus $$R' = R \frac{i}{2i'} = R \div 2 \left(1 - \frac{C}{L}\right) \quad (3)$$

R' is computed from Equation 3 after assuming C/L. C may be assumed between 45% and 55% of L. It is preferably kept closer to 50% and slightly larger than 50%. At a proportion of $C/L = 51\frac{1}{2}\%$ the difference between $R' \sin i'$ and $R \tan(\frac{1}{2}i)$ is extremely small. At angles *i* of 10, 20, 30, 40 degrees it amounts respectively to 0.02, 0.12, 0.23, 0.10 thousandth of an inch per inch of radius R. This is much smaller than the tolerances and deflections.

The outer member 50 is shown integral with its shaft extension 50$_e$. Its ways 64 may be bored.

The sliding blocks 56 that hold the balls *b* have portions 56', 56'' on axially opposite sides of the balls *b*. These portions are held together by arms 67 that straddle their ball *b* (FIG. 7). The arms run the whole length of the blocks. They have a cylindrical outer surface 68 contacting the cylindrical inside surface 65 of outer member 50. Their inner surface 68$_i$ is also cylindrical and coaxial with axis 23 of the outer member. A radial view of a block 56 from the outside is afforded by FIG. 9.

The balls *b* center the universal joint and determine the intersection of the joint axes. With the shown pivotal attachment the intersection point of the axes 23, 25 shifts slightly on axis 25 as the angles *i* vary. It is at 0' when the axes are nearly in alignment. The outside surface 66 of inner member 53 is formed so as not to interfere with the cylindrical inside surface 68$_i$ of the blocks 56. It is a composite surface. The rear part 66' may be a spherical surface centered at 0 and touching surface 68$_i$. The front part 66'' extends inside the extension of surface 66'. It may be a spherical surface centered at 0'.

The ball-parts 47 with their T-slots may be formed by coining. The T-slot could also be produced by broaching, for instance by first cutting the central part of the T-slot and then using one or more circular broaches of the same diameter as part 48 to cut the lateral arms of the T. After hardening the ball-part is preferably lapped to exact spherical shape.

The term ball-part signifies that it contains at least spherical or approximately spherical working portions.

Known seals or boots are used to confine the lubricant. They are not shown.

FIG. 10 illustrates an embodiment of an axially free universal joint based on the principles described with FIGS. 5 to 9. Its outer and inner joint members 050, 053 permit relative displacement in the direction of axis 23. The axial displacement range at the shown design angularity *i* is a distance 0–0$_e$. Within this range the joint is able to transmit uniform motion even though the blocks 056 project somewhat beyond the end of outer member 050 in the out position 0$_e$.

The outer member 050 is here shown made up of a main part of 050' and of a flange part 050'' with shaft portion. The two parts are rigidly secured together by screws 68. In all illustrated examples any one of the illustrated embodiments of the outer member can be used. The ways are preferably straight and parallel to the axis of the respective member. More broadly the waves extend at a constant distance from the axis of the respective members.

The blocks 056 that hold the balls *b* are like the described blocks 56. FIG. 9 can also be considered a radial view of block 056. The pivotable part 048 has the same function as part 48, even though it is shown made up of two pieces, a stem 057 will ball end 058, and a more disklike body 69 secured thereto. Body 69 contains the spherical surface portion 54 and radial projections 62 already described. The projections 62 engage the T-slots 61 of the ball-parts 47. The ball-parts are radially movable in cylindrical bores 060 of the blocks 056. The spherical surface portion 54 engages the described cylindrical surface portions 55 provided on blocks 056 and is centered by them.

Instead of using screws 68, the two parts 050′, 050″ of the outer member may be bonded together, the bond providing also a seal and replacing gasket 75.

FIG. 11 shows a slightly modified design of the embodiments employing ball-parts with T-slots. It is a section through pivot point 49 taken at right angles to the axes of the aligned joint members. The blocks 156 are here made of non-metal, such as for instance nylon, and the bores 160 may be lined with a metal sleeve 70, if desired. The blocks can be inexpensively formed by moulding. The opposite profiles of the ways 164 are less curved than the circular profiles of the driving balls (b) and may be circular arcs centered at 71, 71′ respectively. A shallow groove 72 is shown at the outer end of the profiles. It serves to facilitate a lapping operation of the ways with a known reciprocatory lap that contacts one side of all the ways simultaneously.

I claim:
1. A universal joint comprising an outer member having a plurality of internal ways spaced about its axis,
    an inner member having ways on its outside facing the ways of the outer member,
    the ways of both members extending at a constant distance from the axis of the respective member,
    balls engaging the ways of both members and operatively connecting them,
    an individual block for holding each ball,
    said blocks being individually slidable longitudinally along the ways of one of said members,
    a part pivotable with respect to both said members, and
    an operative connection between said pivotable part and each of said blocks directed toward maintaining the ball centers in a plane bisecting the angle formed between the axes of said two members.

2. A universal joint according to claim 1, wherein said part pivots about two points lying on the axes of said members on opposite sides of the intersection of said axes.

3. A universal joint according to claim 1, wherein said blocks are slidable along the ways of the outer member, the block portions on axially opposite sides of each ball being connected by a pair of arms that straddle said ball.

4. A universal joint according to claim 3, wherein said arms have outside surface portions lying in a cylindrical surface coaxial with said outer member.

5. A universal joint according to claim 1, wherein the ways of said two members are straight and parallel to the axis of the respective member, and said blocks are slidable along the ways of the outer member.

6. A universal joint according to claim 1, wherein the outer member contains on its inside a concave spherical surface portion centered on its axis,
    the inner member contains a matching convex spherical surface portion on the outside of the teeth formed between its ways, for pivotally attaching said members to each other.

7. A universal joint comprising an outer member having a plurality of internal ways spaced about its axis,
    a cup-shaped inner member having ways on its outside facing the ways of the outer member,
    the ways of both members extending at a constatnt distance from the axis of the respective member,
    balls engaging the ways of both members for operatively connecting them,
    ball-holding means for controlling the ball positions lengthwise of said ways,
    a part pivotable with respect to both said members,
    said part having a plurality of radial projections spaced about its axis and disposed wholly on one side of the intersection of the axes of said members, one projection for each ball,
    said projections having plane working surfaces on opposite sides perpendicular to the axis of the pivotal part, and
    an operative connection through said working surfaces between said part and said ball-holding means directed toward maintaining the ball centers in the plane bisecting the angle between the axes of said members
    said ball-holding means surrounding said projections.

8. A universal joint according to claim 1, wherein said part is pivotally attached to one of said members at a point spaced from the intersection of the joint axes.

9. A universal joint according to claim 1, wherein said part is pivotally attached to the inner member,
    the inner member has a composite outside surface in the region of its ways,
    said outside surface being in part a convex spherical surface centered on its axis,
    and in part a surface extending inside the extension of said spherical surface.

10. A universal joint according to claim 1, wherein said part is pivotally attached to the inner member and contains a convex spherical surface portion centered on the axis of the outer member, said blocks are slidable on the ways of the outer member and contain concave cylindrical surface portions coaxial with the outer member and engaging said spherical portions.

11. A universal joint according to claim 10, wherein said pivotable part contains a plurality of end-portions projecting radially from said convex spherical surface,
    said end-portions having a T-shaped cross-section in planes containing the axis of said parts.

12. A universal joint according to claim 1, wherein said pivotable part carries a plurality of ball-parts at a constant radial distance from its axis, to control the positions of said blocks through said ball-parts.

13. In a universal joint of the constant-velocity type,
    a plurality of rolling elements for operatively connecting the two joint members,
    individually movable blocks for holding said elements,
    and block-positioning means including ball-parts, one ball-part for each block.

14. The combination according to claim 13, wherein said ball-parts contain T-shaped slots,
    said T-shaped slots are engaged by radial projections of a pivotable control part,
    the T-shaped slots are curved about the axis of said pivotable part, to permit some turning displacement of said part in said slots.

References Cited
UNITED STATES PATENTS

| | | | |
|---|---|---|---|
| 2,911,805 | 11/1959 | Wildhaber | 64—21 |
| 3,357,209 | 12/1967 | Mooney | 64—21 |
| 3,368,370 | 2/1968 | Grauel | 64—21 |

FOREIGN PATENTS

| | | | |
|---|---|---|---|
| 962,454 | 7/1964 | Great Britain | 64—21 |

JAMES A. WONG, Primary Examiner